United States Patent
Tei et al.

(10) Patent No.: US 7,577,345 B2
(45) Date of Patent: Aug. 18, 2009

(54) WATER/DRIP-PROOF STRUCTURE FOR ACOUSTIC MEMBER AND ELECTRONIC APPARATUS HAVING THE SAME

(75) Inventors: Ko Tei, Hino (JP); Masaya Ota, Hachioji (JP); Kyoji Murayama, Hachioji (JP); Nobuyuki Tanaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 537 days.

(21) Appl. No.: 11/033,048

(22) Filed: Jan. 11, 2005

(65) Prior Publication Data

US 2005/0220448 A1    Oct. 6, 2005

(30) Foreign Application Priority Data

Jan. 15, 2004    (JP)  ............... 2004-008192

(51) Int. Cl.
*G03B 17/08* (2006.01)
*H04M 1/00* (2006.01)

(52) U.S. Cl. ............... 396/29; 396/26; 455/344; 455/556.1; 455/575.1

(58) Field of Classification Search ............ 455/23, 455/90.3, 347, 575.1, 344, 556.1; 396/25, 396/26, 29; 368/281
See application file for complete search history.

(56) References Cited

U.S. PATENT DOCUMENTS

| | | | | |
|---|---|---|---|---|
| 4,313,187 A | * | 1/1982 | Waki et al. | ............ 368/319 |
| 5,737,824 A | * | 4/1998 | Kigawa | ............ 29/594 |
| 6,011,856 A | * | 1/2000 | Kigawa et al. | ............ 381/410 |
| 6,091,181 A | * | 7/2000 | Yamashita | ............ 310/328 |
| 6,188,773 B1 | * | 2/2001 | Murata et al. | ............ 381/361 |
| 2004/0029530 A1 | * | 2/2004 | Noguchi et al. | ............ 455/23 |
| 2006/0114751 A1 | * | 6/2006 | Ferri et al. | ............ 368/281 |

FOREIGN PATENT DOCUMENTS

| | | |
|---|---|---|
| JP | 50-062477 | 10/1974 |
| JP | 59-164383 | 11/1984 |
| JP | 05-007390 | 1/1993 |
| JP | 05-018188 | 3/1993 |
| JP | 08-322096 | 12/1996 |
| JP | 10-210121 | 8/1998 |
| JP | 2000-209686 | 7/2000 |
| JP | 2004-312156 | 11/2004 |

OTHER PUBLICATIONS

Notification of Reasons for Rejection for Japanese Patent Application No. 2004-008192, mailed Mar. 10, 2009 (3 pgs.) with translation (3 pgs.).

* cited by examiner

*Primary Examiner*—Quochien B Vuong
(74) *Attorney, Agent, or Firm*—Straub & Pokotylo; John C. Pokotylo

(57) ABSTRACT

A digital camera having an acoustic member includes a first cover, a water-proof sheet and a second cover. The second cover is spaced from the water-proof sheet. The first cover has a first sound hole opposed to the acoustic member. The water-proof sheet is disposed such as to covers the first sound hole. The second cover has a second sound hole. The second sound hole is deviated in position toward an outer periphery of the first sound hole so that the second sound hole is not located on an extension of an axis of the first sound hole.

3 Claims, 5 Drawing Sheets

US 7,577,345 B2

WATER/DRIP-PROOF STRUCTURE FOR ACOUSTIC MEMBER AND ELECTRONIC APPARATUS HAVING THE SAME

CROSS-REFERENCE TO RELATED APPLICATIONS

This application is based upon and claims the benefit of priority from prior Japanese Patent Application No. 2004-008192, filed Jan. 15, 2004, the entire contents of which are incorporated herein by reference.

BACKGROUND OF THE INVENTION

1. Field of the Invention

The present invention relates to a water/drip-proof structure for an acoustic member which is suitably used for a digital camera, a cellular phone, a recorder and the like, and to an electronic apparatus having the water/drip-proof structure.

2. Description of the Related Art

A digital camera and a cellular phone having sound recording and reproducing function include a sound-generating member such as a speaker and a sound-collecting member such as a microphone. In this description, the sound-generating member and the sound-collecting member are collectively called an acoustic member. It is desired that the acoustic member has a water-proof function.

As means for providing the acoustic member with the water-proof function, a water-proof sheet or a drip-proof sheet is used as described in Jpn. Pat. Appln. KOKAI Publication No. 05-007390 and No. 10-210121 for example. The water-proof sheet or the drip-proof sheet is disposed such as to cover a sound hole. The sound hole is formed at a position opposed to a speaker or a microphone.

When the sound hole is formed at the position opposed to the speaker or the microphone, a water-proof sheet member having water resistance to a degree is required. In the known techniques described in the above documents, a microphone is disposed at a position opposed to the sound hole for example. Therefore, if water impinges directly on the sheet member from a direction opposed to the sheet member, the water seeps into the sheet member by the water pressure.

In order to prevent water from seeping into the sheet member, it is necessary to enhance the water resistance of the sheet member. To enhance the water resistance of the sheet member, it is required to increase the thickness of the sheet member, or to further reduce diameters of fine holes formed in the porous sheet.

BRIEF SUMMARY OF THE INVENTION

This invention provides a water/drip-proof structure of an acoustic member, and an electronic apparatus having the water/drip-proof structure.

According to the invention, there is provided a water/drip-proof structure for an acoustic member, the acoustic member comprising:

a first cover which has a first sound hole at a position opposed to the acoustic member, a water-proof sheet which covers the first sound hole, a second cover which is spaced from an outer surface of the water-proof sheet, and a second sound hole which is opened in the second cover and located at a position spaced from an outer peripheral portion of the first sound hole in a diametrical direction thereof.

The acoustic member is a sound-generating member such as a speaker for example. Another example of the acoustic member is a sound-collecting member such as a microphone.

The water-proof sheet mentioned in this invention may be a porous sheet provided with a large number of fine holes subjected to water-proof treatment or water-repellent treatment, or may be fiber material such as nonwoven fabric whose surface is water-repellent coated.

The water-proof sheet may be disposed such as to extend to a portion opposed to the second sound hole.

In a preferred embodiment, a distance between an opening edge of the first sound hole and the second sound hole is longer than a diameter of the second sound hole.

In a preferred embodiment, the structure may further comprise: a through hole spaced farther from the acoustic member than the second sound hole, and the first cover has a communication portion which extends between the second sound hole and the through hole. In this case, for allowing water to be discharged easily, the space is preferably defined by an arcuate or inclined surface that extends between the second hole and the through hole.

The electronic apparatus of the present invention includes the water/drip-proof structure. Examples of the electronic apparatus are a digital camera having recording and reproducing function, a cellular phone having a camera and a recorder.

DETAILED DESCRIPTION OF THE INVENTION

A first embodiment of the present invention will be explained below with reference to FIGS. 1 to 4.

Figure 1:
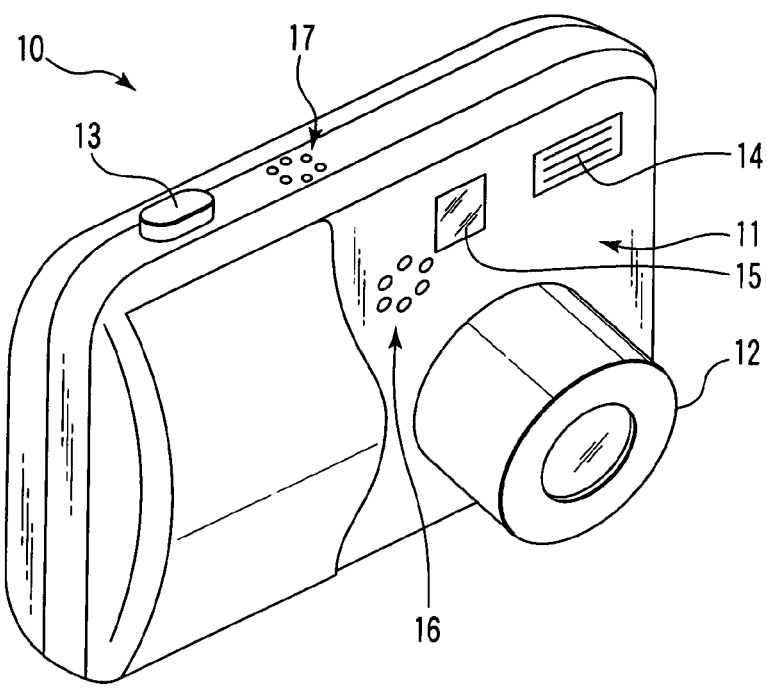
FIG. 1 is a perspective view of a digital camera with a sound recording and reproducing function having a water/drip-proof structure according to a first embodiment of the present invention.

FIG. 1 shows a digital camera 10. The digital camera 10 is one example of an electronic apparatus having recording and reproducing function of sound. The digital camera 10 has a housing 11. In the housing 11, there are provided a barrel 12 including a shooting optical lens, a release button 13, an electronical flash 14, a finder optical system 15, a microphone portion 16, a speaker portion 17 and the like.

A recording and reproducing circuit (not shown) is accommodated in the housing 11. The recording and reproducing circuit comprises recording and reproducing electronic component. For example, the recording and reproducing circuit includes a function for recording sound input from the microphone portion 16 into a recording medium, and a function for outputting the recorded sound from the speaker portion 17. The recording medium may be an on-board memory such as a flash memory built in the digital camera 10 or a memory such as a memory card which can be detachably mounted from outside.

Figure 2:
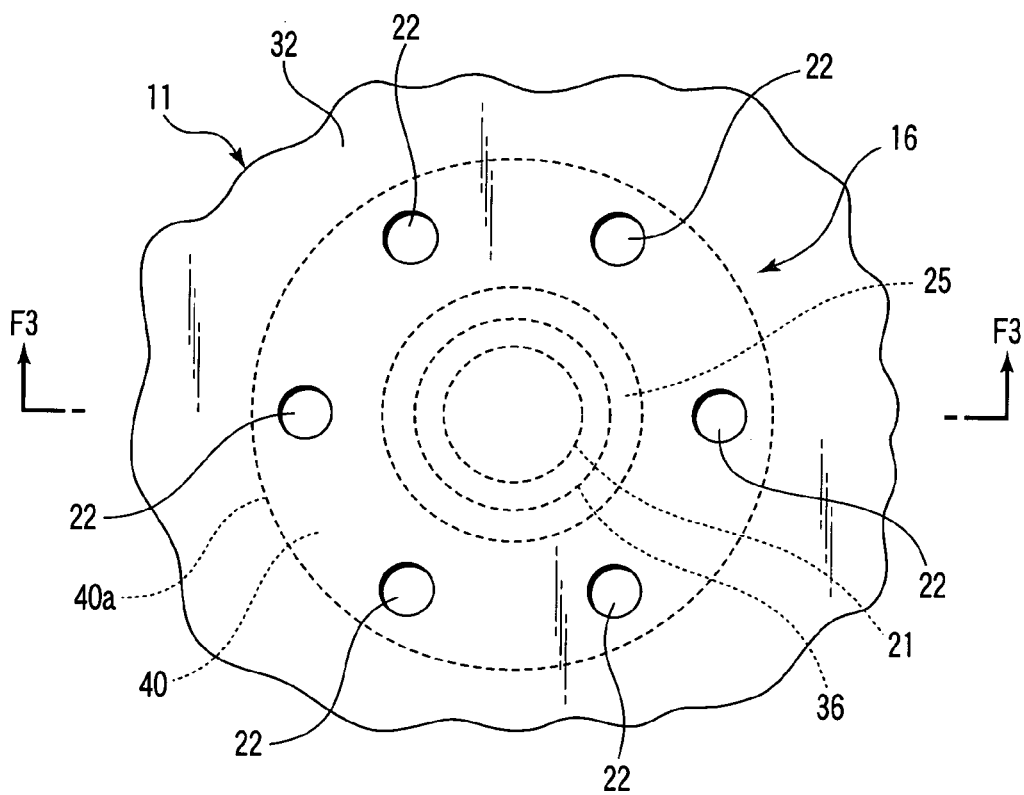
FIG. 2 is an enlarged front view of a microphone portion area of the digital camera shown in FIG. 1.
Figure 3:
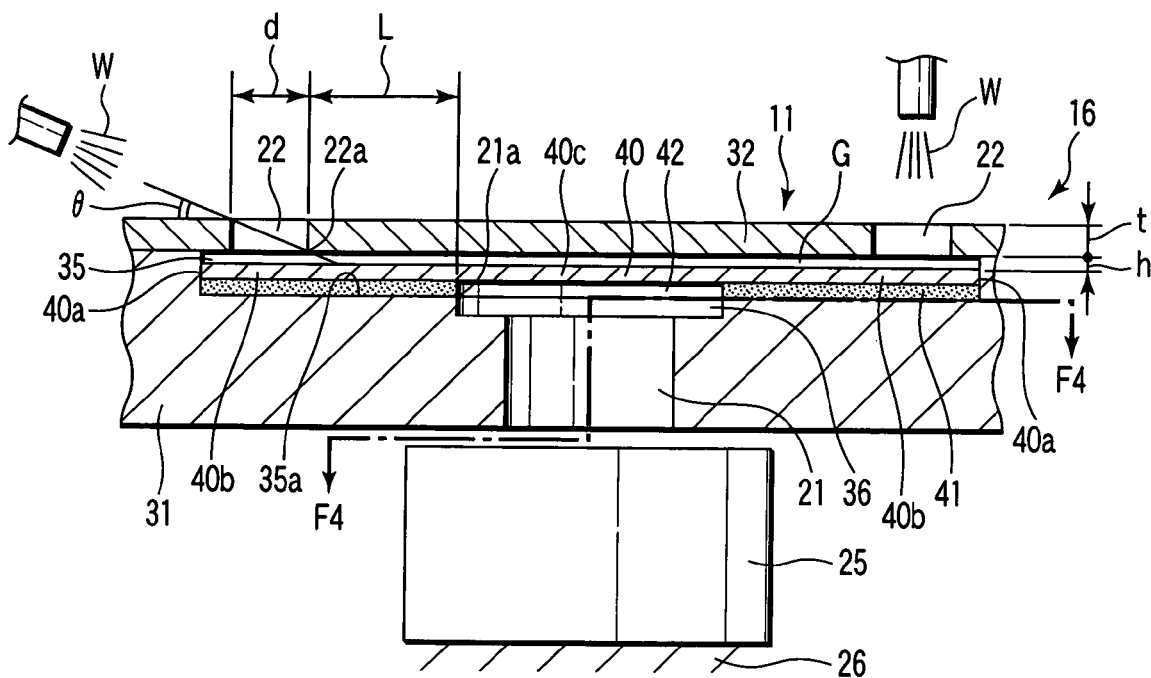
FIG. 3 is a sectional view of the microphone portion taken along the line F3-F3 in FIG. 2.
Figure 4:
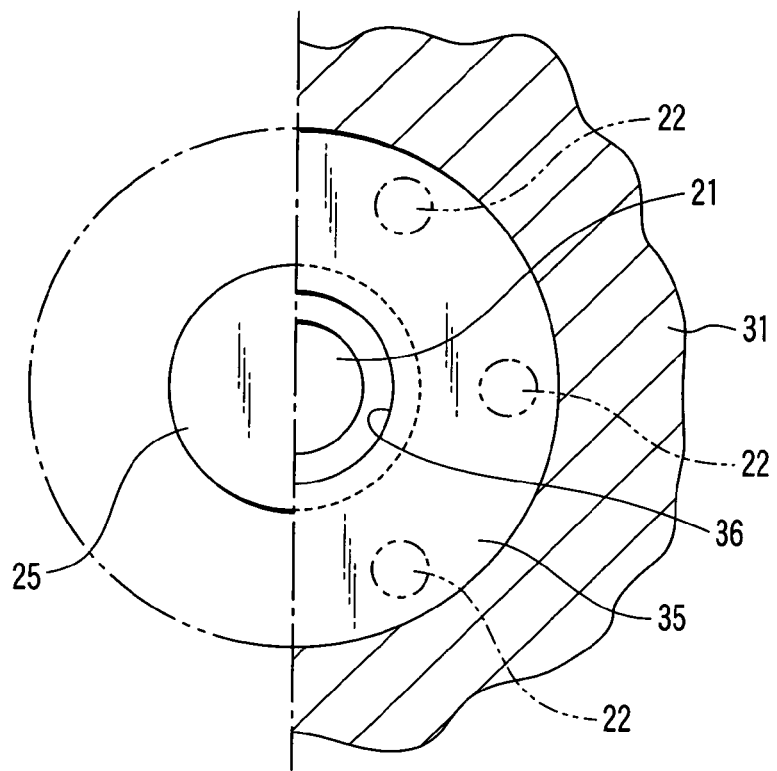
FIG. 4 is a sectional view of the microphone portion taken along the line F4-F4 in FIG. 3.

The microphone portion 16 has a structure as shown in FIGS. 2 to 4. FIG. 2 is a front view of the microphone portion 16 of the digital camera 10. FIG. 3 is a sectional view of the microphone portion 16. As shown in FIGS. 2 and 3, the microphone portion 16 includes one first sound hole 21 and a plurality of second sound holes 22.

As shown in FIG. 3, a microphone 25 which is one example of a sound-collecting member is accommodated in the housing 11. The microphone 25 is fixed to a predetermined position in the housing 11 by a support portion 26 provided in the housing 11.

The housing 11 includes a first cover 31 which is molded using resin, and a second cover 32 covering an outer side of the first cover 31. The second cover 32 functions as an exterior of the housing 11. Therefore, the second cover 32 is made of good-looking designed material. One example of such material is aluminum alloy material which is thinner than the first cover 31, or synthetic resin whose surface is subjected to plating. The support portion 26 which supports the microphone 25 may be formed integrally with the first cover 31, or may be a separate member from the first cover 31.

As shown in FIG. 4, the first cover 31 has the first sound hole 21 and a recess 35. The recess 35 is circular (perfect circle for example) as viewed from a front side of the housing 11. The recess 35 is formed at its center with the first sound hole 21 at a position opposed to a sound-input portion of the microphone 25.

The first sound hole 21 is formed at its end (inlet side of sound) with a diameter expansion portion 36. The diameter expansion portion 36 forms a step such that the inlet side of sound is slightly expanded. The diameter expansion portion 36 is formed over the entire periphery of the first sound hole 21. The first sound hole 21 and the recess 35 are circular in shape. The first sound hole 21 and the recess 35 are concentrically disposed.

A water-proof sheet 40 is disposed in the recess 35. The water-proof sheet 40 is circular in shape for example. The water-proof sheet 40 is fixed to a bottom surface 35a of the recess 35 by a fixing member 41 such as a double-faced adhesive tape. The fixing member 41 is provided at its central portion with a circular opening (shown in FIG. 3) 42. The size of the opening 42 corresponds to that of the diameter expansion portion 36 of the first sound hole 21.

The water-proof sheet 40 is disposed so as to cover the first sound hole 21. As one example, the water-proof sheet 40 is previously provided at its back surface with the fixing member 41 such as the double-faced adhesive tape. The water-proof sheet 40 having the fixing member 41 is adhered to the bottom surface 35a of the recess 35. With this, the water-proof sheet 40 can be mounted on the first cover 31 efficiently.

It is preferable that the water-proof sheet 40 has both water resistance and sound-transmittancy (air permeability). Therefore, as a material of the water-proof sheet 40, a filter sheet made of synthetic resin whose surface is subjected to water-repellent treatment is employed. One example of the filter material is polytetrafluoroethylene (PTFE) having a large number of fine holes of about several μm. The material of the water-proof sheet 40 is not limited to this, and a porous sheet provided with fine holes whose surface is subjected to water-proof treatment or water-repellent treatment may also be employed. The porous sheet mentioned here is nonwoven fabric for example.

As explained above, the water-proof sheet 40 is formed by subjecting the porous sheet provided with the fine holes to the water-proof treatment or water-repellent treatment. By using such a water-proof sheet 40, a water/drip-proof structure required for the microphone portion 16 can be obtained, and the sound-transmittancy can be secured. Thus, the microphone portion 16 has the water-proof drip-proof structure, and can exhibit achieve sound quality.

As shown in FIG. 3, a slight gap G (shown in FIG. 3) formed between an inner surface of the second cover 32 and an outer surface of the water-proof sheet 40. In other words, the second cover 32 is spaced from the water-proof sheet 40. Sound (vibration of air) which enters the inside of the second cover 32 from the second sound hole 22 reaches the first sound hole 21 through the gap G.

The second cover 32 is provided with a plurality of second sound holes 22. For example, six second sound holes 22 are formed in the circumferential direction of the microphone 25 at equal distances from one another. These second sound holes 22 are formed at positions corresponding to a region where the circular recess 35 is formed. The second sound holes 22 are disposed such that the second sound holes 22 do not exist on an extension of an axial direction of the first sound hole 21. That is, second sound holes 22 are formed to have axises spaced from an axis of the first sound hole 21 by distance longer than a sum of the radius of the first sound hole 21 and the radius of the second sound hole 22.

As shown in FIG. 3, an outer peripheral portion 40a of the water-proof sheet 40 extends to a position opposed to the second sound hole 22. More preferably, the outer peripheral portion 40a of the water-proof sheet 40 extends beyond a portion opposed to the second sound hole 22. With this design, it is possible to prevent a cutting surface of the outer peripheral portion 40a of the water-proof sheet 40 from directly impinging on water which enters from the second sound hole 22. With this, it is possible to more reliably prevent water from seeping into the water-proof sheet 40.

As shown in FIG. 3, a distance between an opening edge (in other words rim) 21a of an end of the first sound hole 21 and an end 22a of the second sound hole 22 is defined as L, a diameter of the second sound hole 22 is defined as d, a thickness of the second cover 32 is defined as t, and a distance of the gap G between the second cover 32 and the water-proof sheet 40 is defined as h. These values are set such that the following relations (1) and (2) are established:

$$\{L-(h/\tan\theta)\}>0 \tag{1}$$

$$\theta=\tan^{-1}(t/d) \tag{2}$$

More concretely, L is set longer than d due to the following reason. The housing 11 includes the first cover 31 and the second cover 32. Therefore, the greater the thickness t of the second cover 32, the greater the housing 11 becomes in size. As the distance h between the second cover 32 and the water-proof sheet 40 is shorter, it becomes easier to obtain the water-proof effect. Therefore, the values are generally set such that a relation of t≧h is established.

When t≧h, the distance L from the opening edge 21a of the first sound hole 21 to the end 22a of the second sound hole 22 is set longer than the diameter d of the second sound hole 22, that is L>d. With this structure, even if water stream W impinges from an oblique direction (angle θ shown in FIG. 3), the water stream W does not impinge directly on the opening edge 21a of the first sound hole 21.

As explained above, by mutually deviating the first sound hole 21 and the second sound hole 22 in position, the water stream W entering from the second sound hole 22 into the inside of the second cover 32 is received by a portion 40b close to the outer periphery of the water-proof sheet 40. The portion 40b close to the outer periphery of the water-proof sheet 40 is supported by the bottom surface 35a of the recess 35. A portion 40c of the water-proof sheet 40 close to its central portion covers the first sound hole 21. Since it is possible to prevent the water stream W from directly impinging on the portion 40c close to the central portion of the water-proof sheet 40, even if the water resistance of the water-proof sheet 40 is about 30 kpa, water/drip-proof function practically having no problem can be achieved.

At the time of sound recording, sound (vibration of air) entering from the second sound hole 22 into the inside of the second cover 32 reaches the first sound hole 21 through the gap G between the second cover 32 and the water-proof sheet 40. Therefore, the sound entering from the second sound hole 22 into the inside of the second cover 32 can be guided into the microphone 25. Since a relatively thin sheet having excellent sound-transmittancy is used as the water-proof sheet 40, a sound pressure level suitable for sound recording can be obtained.

Figure 5:
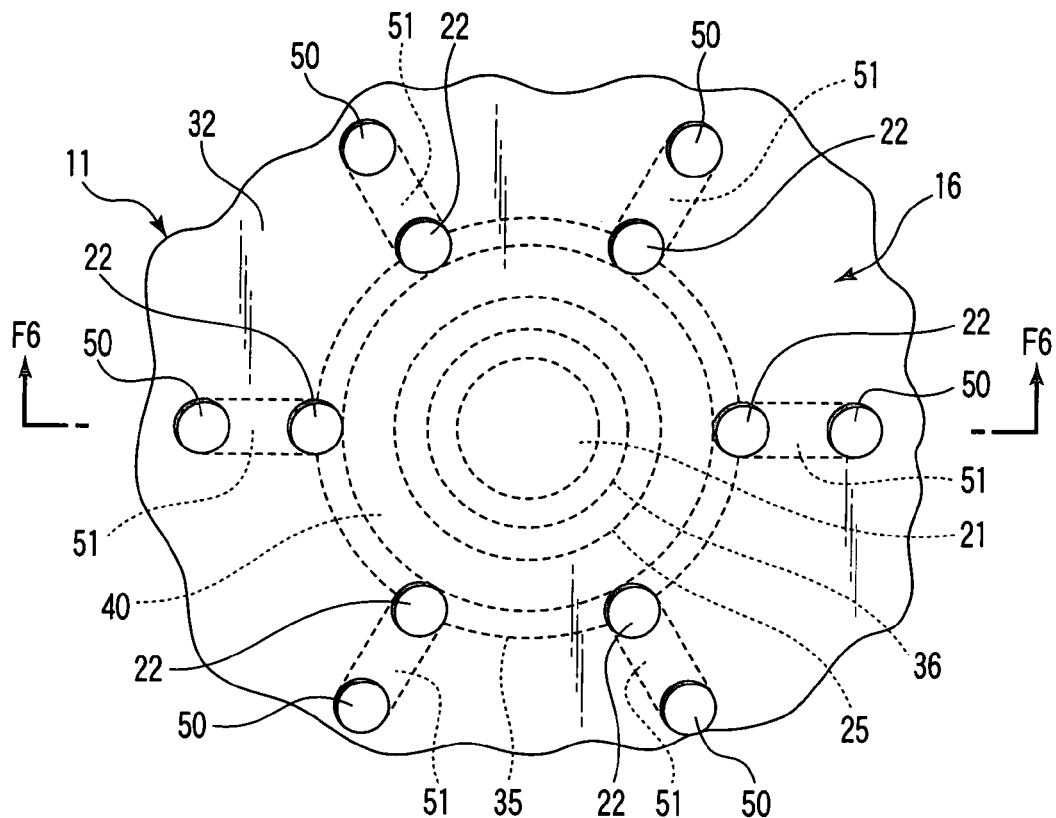
FIG. 5 is a front view of a microphone portion according to a second embodiment of the present invention.
Figure 6:
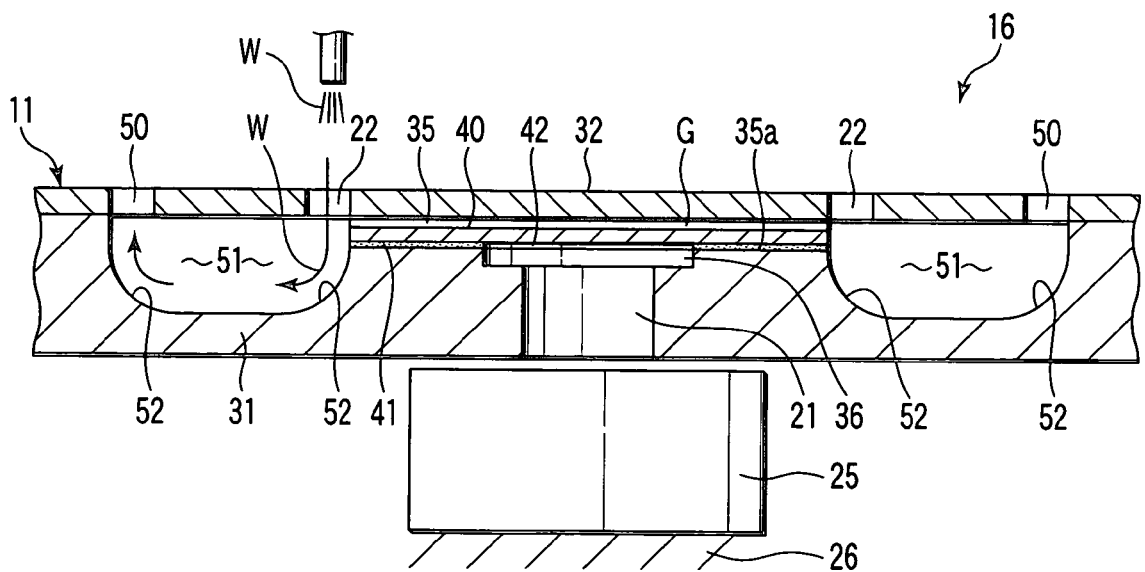
FIG. 6 is a sectional view of the microphone portion taken along the line F6-F6 in FIG. 5.

FIGS. 5 and 6 show a water/drip-proof structure of a second embodiment of the present invention. In the second embodiment, the same members as those of the first embodiment (FIGS. 1 to 4) are designated with the same symbols and detailed explanation thereof will be omitted.

FIG. 5 shows the microphone portion 16 as viewed from a front side of the housing 11, and FIG. 6 is a sectional view thereof. As shown in FIG. 5, a plurality of (for example, six) second sound holes 22 are formed in the circumferential direction of the microphone 25 at equal distances from each other. The second cover 32 is provided with through holes 50 each of which pairs up with each second sound hole 22. The through holes 50 are formed at positions separated from the microphone 25 with respect to the second sound holes 22. The through hole 50 can also function as a third sound hole.

The first cover 31 is provided with communication portions 51 which respectively bring the second sound holes 22 and the through holes 50 into communication with each other. As shown in FIG. 6, an inner surface of the communication portion 51, that is, a wall surface connected to the second sound hole 22 and the through hole 50 is provided with arc portions 52 at positions where the water stream passes. With this structure, water which enters from the second sound hole 22 into the communication portion 51 can easily be discharged out from the through hole 50, or water which enters from the through hole 50 into the communication portion 51 can easily be discharged out from the second sound hole 22.

In the water/drip-proof structure of the second embodiment having such structure, sound (vibration of air) which enters into the inside of the second cover 32 from the second sound hole 22 or the through hole 50 reaches the first sound hole 21 through the gap G between the second cover 32 and the water-proof sheet 40.

The water stream W entering from the second sound hole 22 into the inside of the second cover 32 can be discharged from the through hole 50 through the communication portion 51. Therefore, the water pressure applied to the water-proof sheet 40 can be reduced, and it is possible to more effectively prevent water from seeping into the water-proof sheet 40. With this, a material having excellent sound-transmittancy can be used for the water-proof sheet 40, the sound quality is enhanced, and a sound pressure at the time of input into the microphone 25 can be secured.

Figure 7:
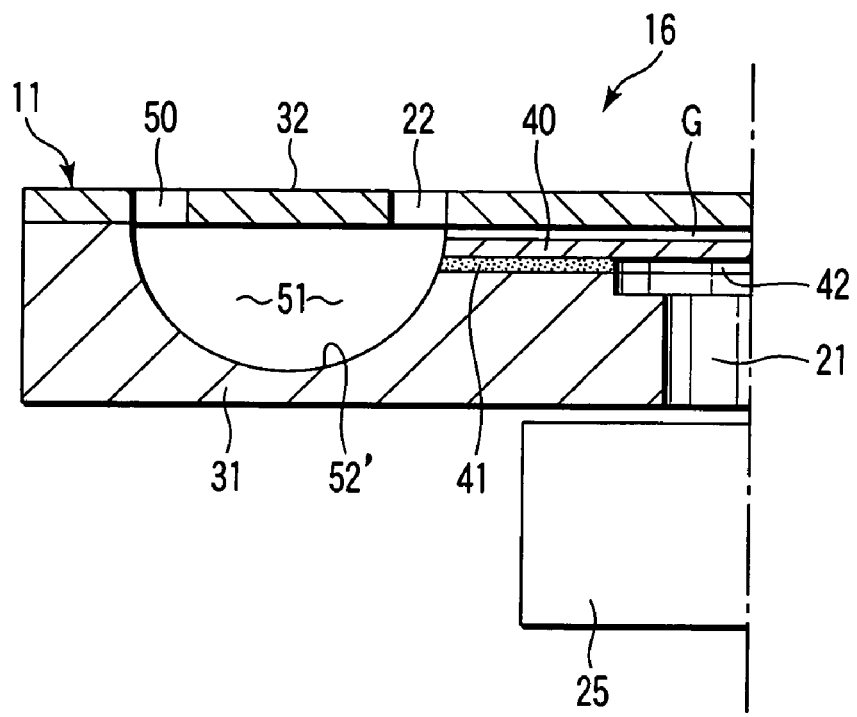
FIG. 7 is a sectional view of a microphone portion according to a third embodiment of the present invention.

FIG. 7 shows a water/drip-proof structure of a third embodiment of the present invention. In this third embodiment, substantially semi-circular arc surfaces 52' are formed in the inner surface of the communication portion 51, that is, a wall connected to the second sound hole 22 and the through hole 50. With the arc surfaces 52', water stream entering from the second sound hole 22 into the inside of the second cover 32 can easily be discharged from the through hole 50.

Figure 8:
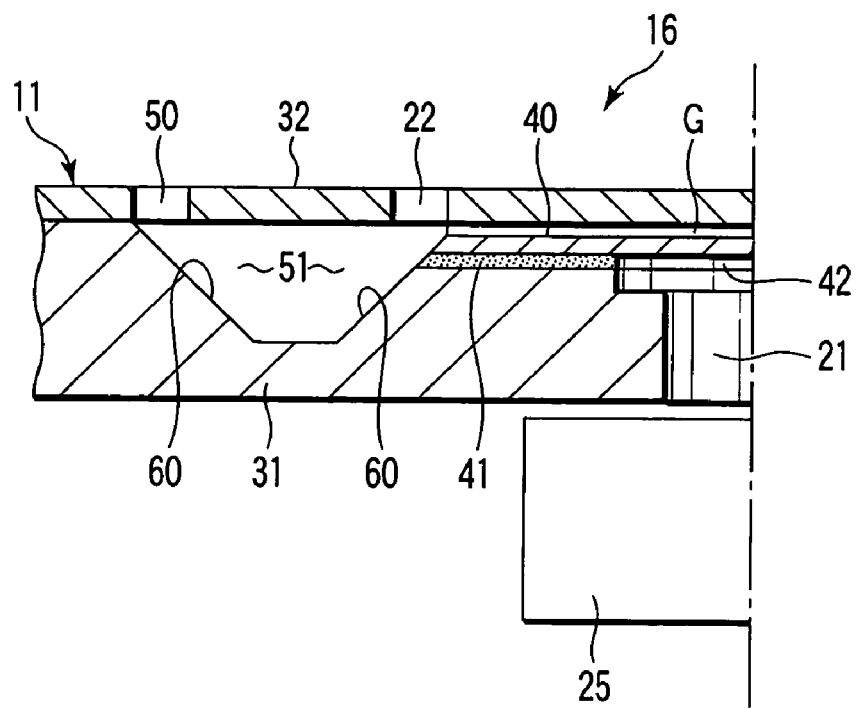
FIG. 8 is a sectional view of a microphone portion according to a fourth embodiment of the present invention.

FIG. 8 shows a water/drip-proof structure of a fourth embodiment of the present invention. In this embodiment, a slant surface 60 is formed on the wall of the communication portion 51 connected to the second sound hole 22 and the through hole 50. With this slant surface 60, water stream entering from the second sound hole 22 into the inside of the second cover 32 can easily be discharged from the through hole 50. In these third and fourth embodiments, the same members as those of the second embodiment (FIGS. 5 and 6) are designated with the same symbols, and detailed explanation will be omitted.

Figure 9:
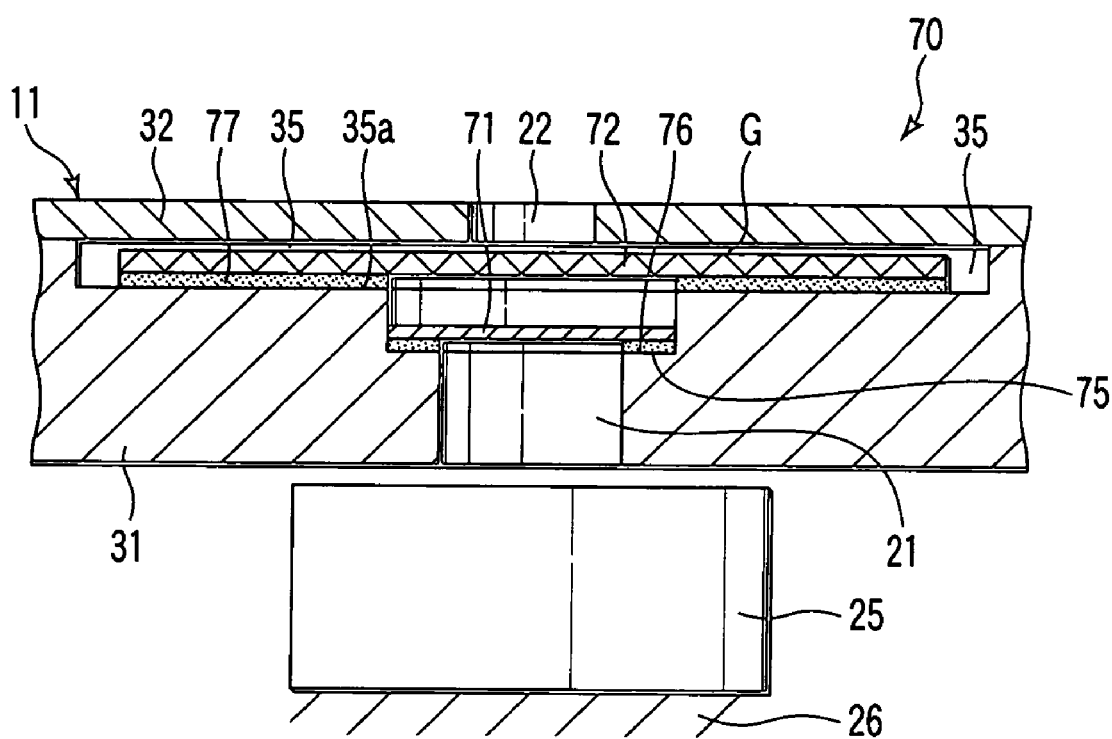
FIG. 9 is a sectional view of a microphone portion showing another example of a water/drip-proof structure.

FIG. 9 shows a microphone portion 70 having a water/drip-proof structure of another embodiment. In the microphone portion 70, the same members as those of the first embodiment (FIGS. 1 to 4) are designated with the same symbols, and detailed explanation will be omitted.

The microphone portion 70 shown in FIG. 9 includes first and second sound holes 21 and 22 located on substantially the same axis, a first water-proof sheet 71 and a second water-proof sheet 72. The first water-proof sheet 71 is made of the same material as that of the water-proof sheet 40 of the first embodiment. The first water-proof sheet 71 is fixed to an end surface 76 of the first sound hole 21 closer to an inlet of sound by means of a fixing member 75 such as a double-faced adhesive tape.

The thickness of the second water-proof sheet 72 and the diameter of the fine hole thereof are respectively greater than the thickness of the first water-proof sheet 71 and the diameter of the fine hole thereof. Although the second water-proof sheet 72 is lower water-proof ability as compared with that of the first water-proof sheet 71, the second water-proof sheet 72 is made of material having higher sound-transmittancy. The second water-proof sheet 72 is fixed to a bottom surface 35a of the recess 35 by means of a fixing member 77 such as a double-faced adhesive tape. The second water-proof sheet 72 receives water stream entering from the second sound hole 22 toward the first sound hole 21. With this structure, water stream is prevented from impinging directly on the first water-proof sheet 71 from outside.

That is, the second water-proof sheet 72 weakens the momentum of water stream from outside. Thus, even if impact resistance (compressive strength) of the first water-proof sheet 71 against water stream is low, practically sufficient water-proof ability can be obtained. In this embodiment, the second water-proof sheet 72 disposed near to the second sound hole 22 mainly has a function for enhancing the impact resistance (compressive strength) against the water stream. The first water-proof sheet 71 disposed near to the first sound hole 21 mainly has a function for enhancing the water-proof ability.

As described above, the microphone portion 70 having the water/drip-proof structure includes the first water-proof sheet 71 and the second water-proof sheet 72. The first water-proof sheet 71 has high water-proof ability but is made of thin material, and mainly has the function for enhancing the water-proof ability. The second water-proof sheet 72 has lower water-proof ability, but is made of material having high sound-transmittancy (air permeability), and mainly has the function for enhancing the impact resistance against the water stream. By disposing the first water-proof sheet 71 close to the first sound hole 21 and by disposing the second water-proof sheet 72 close to the second sound hole 22, it is possible to enhance both the water resistance ability and sound quality.

Figure 10:
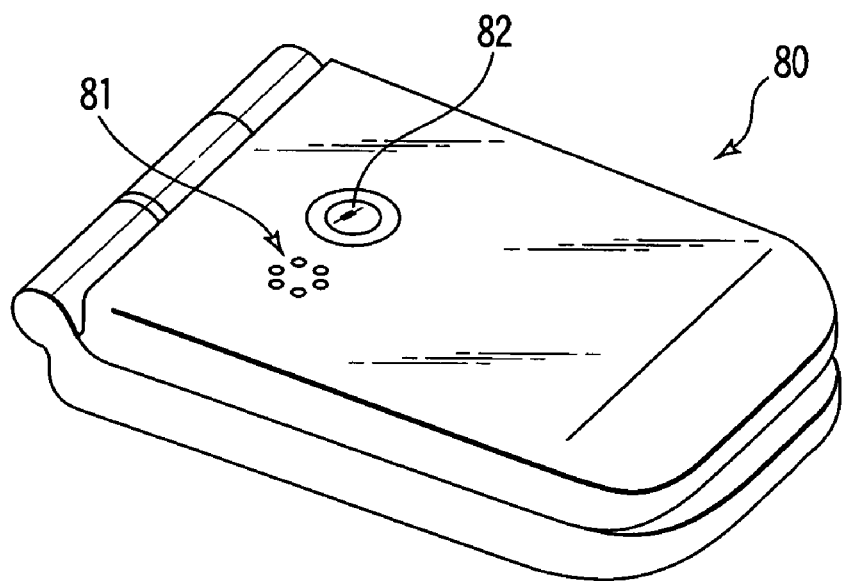
FIG. 10 is a perspective view showing a cellular phone having a camera as another example of an electronic apparatus.

FIG. 10 shows a cellular phone 80 having a camera as another example of the electronic apparatus having the water/drip-proof structure. The cellular phone 80 has the recording and reproducing function and shooting function. The water/drip-proof structure explained in each of the above embodiments is employed for a microphone portion 81 or a speaker portion (not shown) of the cellular phone 80 having the camera. With this, it is possible to enhance the water-proof ability of the cellular phone 80 having the camera. In this embodiment, although the microphone portion 81 is disposed on the surface on the same side as a shooting lens portion 82, the microphone portion 81 may be disposed on another position.

According to the water/drip-proof structure of each the embodiment, the water resistance ability of the acoustic member such as a microphone and a speaker can be enhanced with the relatively simple structure, and deterioration of sound quality can also be reduced. With this, it is possible to provide an electronic apparatus having a recording and reproducing function having excellent water/drip-proof ability and excellent sound quality.

Although the water/drip-proof structure of the present invention is employed for the microphone portion in each the embodiment, a water/drip-proof structure having the same structure may be employed for a speaker portion. It is apparent that when the present invention is to be carried out, the constituent elements of the present invention such as the acoustic member, the water-proof sheet, the first and second covers and the like can appropriately be modified without departing from the subject matter of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A water/drip-proof structure of a camera having an acoustic member, comprising:

a first member which has a first sound hole at a position opposed to the acoustic member;

a first water-proof sheet which is disposed on the first member so as to cover the first sound hole;

a second member which is spaced from the first water-proof sheet and disposed so as to face the outer surface of said water-proof sheet, and which has a second sound hole; and a second water-proof sheet which is disposed between the first water-proof sheet and the second member which has the second sound hole, wherein the first water-proof sheet is made of thin material having high water-proof ability compared with the second water-proof sheet, the first water-proof sheet enhancing water-proof ability, wherein the second water-proof sheet is made of thick material having high sound-transmittancy and having low water-proof ability compared with the first water-proof sheet, the second water-proof sheet enhancing the impact resistance against water stream, wherein the acoustic member, the first water-proof sheet and the second water-proof sheet are located on a same axis, and wherein, when a water stream enters the second hole, the second water-proof sheet weakens momentum of the water stream entering from the second sound hole, and then the first water-proof sheet secures water-proof ability against the acoustic member and secures a sound-transmittancy from the first and second sound holes to the acoustic member, thereby securing sound quality detected by the acoustic member.

2. The water/drip-proof structure of a camera according to claim 1, wherein the first sound hole and the second sound hole are located on a same axis.

3. The water/drip-proof structure of a camera according to claim 2, wherein a first recess which has a larger diameter than the first sound hole and a second recess which has a larger diameter than the first recess are formed on the first member, the first water-proof sheet is fixed to a bottom surface of the first recess, and the second water-proof sheet is fixed to a bottom surface of the second recess.

* * * * *